US011117215B2

(12) United States Patent
Mottin

(10) Patent No.: US 11,117,215 B2
(45) Date of Patent: Sep. 14, 2021

(54) METHOD FOR HARD-SURFACING METAL PARTS FOR AIRCRAFT TURBOFANS, AND LOCAL PROTECTION TOOL FOR IMPLEMENTING THE METHOD

(71) Applicant: SNECMA, Paris (FR)

(72) Inventor: Jean-Baptiste Mottin, Poitiers (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 973 days.

(21) Appl. No.: 14/399,751

(22) PCT Filed: May 7, 2013

(86) PCT No.: PCT/FR2013/051016
§ 371 (c)(1),
(2) Date: Nov. 7, 2014

(87) PCT Pub. No.: WO2013/167841
PCT Pub. Date: Nov. 14, 2013

(65) Prior Publication Data
US 2015/0114938 A1 Apr. 30, 2015

(30) Foreign Application Priority Data
May 9, 2012 (FR) ...................................... 1254191

(51) Int. Cl.
B23K 26/12 (2014.01)
B23P 6/00 (2006.01)
(Continued)

(52) U.S. Cl.
CPC .............. *B23K 26/12* (2013.01); *B22F 5/009* (2013.01); *B22F 5/04* (2013.01); *B22F 10/20* (2021.01);
(Continued)

(58) Field of Classification Search
CPC ... B23K 26/067; B23K 26/246; B23K 26/032
(Continued)

(56) References Cited

U.S. PATENT DOCUMENTS 5,262,612 A * 11/1993 Momany ................ B23K 26/10
219/121.67
6,326,585 B1 * 12/2001 Aleshin ................ B23K 26/032
219/121.63
(Continued)

FOREIGN PATENT DOCUMENTS

CN 86101259 A 12/1986
CN 2346379 Y 11/1999

OTHER PUBLICATIONS

Machine Translation of Hirokazu et al (CN86101259); Apr. 2020.*
International Search Report issued in International Application No. PCT/FR2013/051016, dated Aug. 7, 2013.

*Primary Examiner* — Tu B Hoang
*Assistant Examiner* — Thomas J Ward
(74) *Attorney, Agent, or Firm* — Pillsbury Winthrop Shaw Pittman LLP

(57) ABSTRACT

A method for hard-surfacing metal parts for an aircraft turbofan, the method involving the use of a nozzle outputting a laser beam or an electron beam, which is to heat a sprayed powder for hard-surfacing the metal part, the method including positioning the metal part to be hard-surfaced in an enclosure, the top portion of which has an opening; positioning a mobile cover covering the opening of the top portion, the mobile cover having an opening; positioning the nozzle at the opening of the mobile cover; feeding an inert gas into the enclosure; spraying metal powders and emitting the laser or electron beam for hard-surfacing the metal part; moving the nozzle relative to the enclosure along a path for hard-surfacing the metal part, the (Continued)

movement of the nozzle causing the movement of the mobile cover on the top surface of the enclosure.

17 Claims, 2 Drawing Sheets

(51) Int. Cl.
| | |
|---|---|
| *B23K 26/34* | (2014.01) |
| *B22F 5/00* | (2006.01) |
| *B22F 5/04* | (2006.01) |
| *B23K 35/02* | (2006.01) |
| *B23K 26/342* | (2014.01) |
| *B23K 26/144* | (2014.01) |
| *B23K 26/32* | (2014.01) |
| *B22F 10/20* | (2021.01) |
| *B23K 15/00* | (2006.01) |
| *B22F 7/06* | (2006.01) |
| *B23K 103/08* | (2006.01) |
| *B23K 103/14* | (2006.01) |
| *B23K 103/18* | (2006.01) |
| *B23K 103/00* | (2006.01) |
| *B23K 101/00* | (2006.01) |
| *B23K 103/10* | (2006.01) |

(52) U.S. Cl.
CPC ........ *B23K 15/0086* (2013.01); *B23K 26/144* (2015.10); *B23K 26/32* (2013.01); *B23K 26/34* (2013.01); *B23K 26/342* (2015.10); *B23K 35/0244* (2013.01); *B23P 6/007* (2013.01); *B22F 2007/068* (2013.01); *B23K 2101/001* (2018.08); *B23K 2103/08* (2018.08); *B23K 2103/10* (2018.08); *B23K 2103/14* (2018.08); *B23K 2103/26* (2018.08); *B23K 2103/50* (2018.08); *Y02P 10/25* (2015.11)

(58) Field of Classification Search
USPC ........ 427/140; 118/400; 219/121.63, 121.64, 219/121.67, 121.82
See application file for complete search history.

(56) References Cited

U.S. PATENT DOCUMENTS

| | | | |
|---|---|---|---|
| 7,939,003 B2* | 5/2011 | Bonassar | ................ A61L 27/36 264/308 |
| 8,053,701 B2* | 11/2011 | Will | ....................... B23K 26/12 219/121.63 |
| 2011/0217457 A1 | 9/2011 | Huttner et al. | |

* cited by examiner

METHOD FOR HARD-SURFACING METAL PARTS FOR AIRCRAFT TURBOFANS, AND LOCAL PROTECTION TOOL FOR IMPLEMENTING THE METHOD

CROSS REFERENCE TO RELATED APPLICATIONS

This application is the U.S. National Stage of PCT/FR2013/051016, filed May 7, 2013, which in turn claims priority to French Patent Application No. 1254191, filed May 9, 2012, the entire contents of all applications are incorporated herein by reference in their entireties.

TECHNICAL FIELD OF THE INVENTION

The invention relates to a method for hard-surfacing metal parts for aircraft turbofans. It also relates to a specific tool for locally protecting metal parts to be hard-surfaced by the method according to the invention.

Therefore, the technical field of the invention generally relates to the field of aircraft engines, and more particularly the field of repair by a method for hard-surfacing some metal parts of aircraft engines.

Without being limiting, the considered metal part is advantageously, for example, a vane of a one-piece bladed disk, or even any part having a trailing edge and/or a leading edge, for example blades of a low pressure turbine. In practice, the invention relates to any metal part of an aircraft turbofan having a portion, especially an end, requiring a hard-surfacing operation, that is an operation of repair by restoring an appropriate shape of the considered part, by a TIP repair type method. The TIP repair type methods use a method for spraying a directed laser (or a directed electron beam), operating a selective powder melting (the method is especially referred to by "laser cladding", or "laser metal deposition"), which enables, by successively passing a laser on a powder deposit, the considered part to be restored.

The metal parts which are advantageously concerned by the invention are those having an oxidation risk during the hard-surfacing operation. This is the case for metal parts comprising titanium, but also nickel, aluminium or even cobalt. For such parts, it is actually necessary, in order to prevent any degradation of the mechanical characteristics of the considered part, to prevent any oxidation of said part.

TECNONOLOGICAL BACKGROUND OF THE INVENTION

In the state of the art, several solutions have been provided to conduct such operations of laser hard-surfacing in order to repair some metal parts. The use of large sized chambers has especially been provided, creating a gap either filled with neutral gas, or which was vacuumed, in which are fed the part to be hard-surfaced and all the equipment involved for the hard-surfacing; but such a solution is expensive, and its implementation is slow, because of the large amounts of inert gases fed into the considered chamber. Another solution provided in the state of the art is illustrated in FIG. 1. This figure shows a vane 101 an end 102 of which was damaged and must undergo a hard-surfacing by laser melting. To this end, a nozzle 103 is used, which emits a laser beam, or more generally an electron beam, which is to make a powder melt in order to hard-surface the end 102.

In the method of the state of the art illustrated in FIG. 1, a protection enclosure 104 was placed at the end of the nozzle 103. The protection enclosure 104 has a bottom end with a notch 105 having the overall shape of an inverted U, in which notch 105, the end 102 to be hard-surfaced is inserted. The inside volume of the notch 105 is emptied of its oxygen by sending a neutral gas, for example argon or helium, through pipes 106 connected to the nozzle 103; the hard-surfacing of the end 102 can thus be carried out without an oxidation phenomenon. In such an example, a gas coming from the nozzle is therefore used as a local protection for the area to be rebuilt.

However, such a method is not satisfactory to hard-surface the end 102 over a significant distance of a few centimetres. Yet, the end 102 of the vane 101 is curved, and the translational movement to which the nozzle 103 is limited prevents the protection enclosure from moving over this significant distance. Indeed, the notch 105, in order to be able to fulfil its filling with a neutral gas, and so that the protection enclosure 104 can be inserted between the vane 101 and the neighbouring vanes—not shown—must have a limiting dimension. Such a limitation of these dimensions results in the notch 105 walls being close to each other, and rapidly contacting the end 102, consequently preventing the possibility of hard-surfacing over the whole end 102 to be hard-surfaced.

GENERAL DESCRIPTION OF THE INVENTION

The object of the invention offers a solution to the issues just explained, by providing a method and a tool, which are inexpensive, for locally protecting the hard-surfacing of metal parts which allows a large translational movement of the nozzle in order to be able to reach the entire area to be hard-surfaced, said tool being not too bulky in order not to be hindered by the presence of neighbouring parts, for example vanes. To this end, the protection enclosure is provided to be made non-integral with the nozzle emitting the laser beam. In order to restrict the losses of neutral gases fed into the enclosure, an enclosure top closing means is also provided, said closing means not hindering the movement of the nozzle, and ensuring a sufficient insulation in order for the presence of a neutral gas to effectively prevent the oxidation of the part during hard-surfacing; the ensured insulation prevents the neutral gas from escaping too rapidly from the enclosure and being replaced therein by ambient oxygen, and the described oxidation phenomenon from being caused.

Therefore, in the invention, in order to avoid using a whole chamber, comprising the part to be hard-surfaced and the equipment supporting the nozzle, under a neutral gas, a local protection tool mounted on the vane to be hard-surfaced is used. This tool enables an inert area all around the part, and any oxidation to be prevented during the hard-surfacing.

To this tool is coupled a mobile cover closely fitting the shape of the tool throughout the hard-surfacing which is put into movement by the nozzle for gas spraying.

Thus, the invention essentially relates to a method for hard-surfacing metal parts for an aircraft turbofan, said method involving the use of a nozzle emitting a laser beam, or an electron beam, which is to heat a powder sprayed on the part for hard-surfacing said metal part, characterised in that said method comprises the various following steps:

positioning the metal part to be hard-surfaced in an enclosure, the top portion of which has an opening;
positioning a mobile cover covering the opening of the top portion, said mobile cover having an opening;
positioning the nozzle at the opening of the mobile cover;

feeding an inert gas into the enclosure;
spraying metal powders and emitting the laser for hard-surfacing the metal part;
moving the nozzle relative to the enclosure, along a path for hard-surfacing the metal part, the movement of the nozzle causing the movement of the mobile cover on the top surface of the enclosure.

Besides the main characteristics just mentioned in the preceding paragraph, the method according to the invention can have one or more additional characteristics among the following, taken into consideration individually or according to the technically possible combinations:

the movement of the mobile cover is caused by the nozzle contacting a reinforcement of the opening of the cover covering the top portion,
the top portion supports guide rails, the movement of the mobile cover being guided by the guide rails,
the method comprises the further step of, prior to the step of positioning the mobile cover, positioning the guide rails on the top portion of the enclosure,
the step of positioning the metal part to be hard-surfaced in the enclosure comprises an operation for feeding, through an opening provided in a bottom portion of the enclosure, said metal part,
the path for hard-surfacing the metal part comprises several back and forth motions, the nozzle having a hard-surfacing distance relative to the metal part which varies as the back and forth motions proceed,
the hard-surfacing distance varies from three millimetres to thirty millimetres.

The present invention also relates to a tool, able to implement the method according to the invention, for hard-surfacing metal parts for an aircraft turbofan, said hard-surfacing being carried out by means of a laser, generated by a nozzle, heating a powder for hard-surfacing said metal part, characterised in that said tool comprises:

an enclosure having:
  a bottom opening through which a metal part to be hard-surfaced is fed;
  a top portion with an opening;
a mobile cover covering the opening of the top portion, said mobile cover having an opening at which the nozzle is positioned to carry out the hard-surfacing of the metal part, said cover being driven into movement by the nozzle following a path for hard-surfacing.

Besides the main characteristics just mentioned in the preceding paragraph, the tool according to the invention can have one or more additional characteristics among the following, taken into consideration individually or according to the technically possible combinations:

the mobile cover is made of a soft material, especially of aluminium strips, or with metal plates joined by a metal strip,
the tool comprises an intermediate part, positioned at least on the top portion of the enclosure, having a first guide rail and a second guide rail able to guide the movement of the mobile cover,
the intermediate part comprises an opening facing which the metal part to be hard-surfaced is positioned,
the enclosure and the intermediate part form a one-piece element,
the tool comprises means for sealing the bottom opening of the enclosure receiving the metal part to be hard-surfaced,
the enclosure comprises means for feeding an inert gas, and also comprises gaps for leaking the inert gas at the opening of the mobile cover.

The invention and its various applications will be better understood upon reading the following description and upon examining the accompanying figures.

BRIEF DESCRIPTION OF THE FIGURES

The figures are only presented by way of indication and not limitation at all of the invention.

The figures show.

DETAILED DESCRIPTION OF AT LEAST ONE EMBODIMENT OF THE INVENTION

Figure 2:
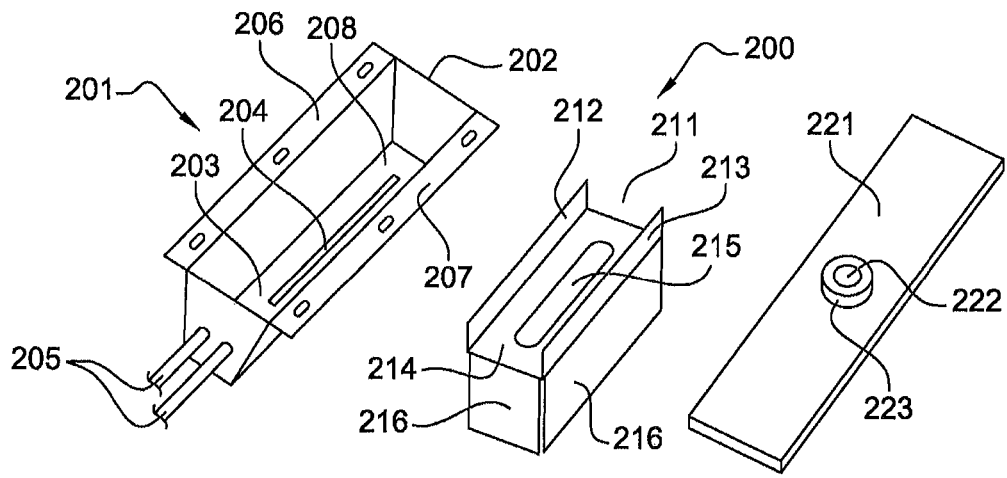
in FIG. 2, a schematic representation of an exemplary tool apt to be associated for implementing the method according to the invention.

FIG. 2 shows an exemplary tool 200 according to the invention.

The tool 200 here comprises:
an insulation enclosure 201, sometimes referred to as "argon box", having an open top portion 202, thus defining a main opening 208 of the enclosure 201, a bottom portion 203 having an opening 204, and receiving means 205 for feeding an inert gas. The top portion 202 has a first planar support 206 and a second planar support 207 provided on either side of the opening 208; the opening 204 is intended to be passed through by a portion of the part to be hard-surfaced, the enclosure 201 being then integral with the considered part;
an intermediate part 211, especially having a first guide rail 212 and a second guide rail 213 provided on either side of a top surface 214 of said intermediate part 211; the first guide rail 212 and the second guide rail 213 extend substantially perpendicularly to the top surface 214; the top surface 214 has an opening 215 and flanks 216. It is advantageously made of a soft material, for example of aluminium;
a mobile cover 221, having a substantially rectangular shape made of a soft material, for example by using aluminium strips, or metal plates joined by a metal strip; the mobile cover 221 has an opening 222, positioned substantially in the centre of said mobile cover; advantageously, the opening 222 has a reinforcement 223, for example having a cylindrical shape.

Figure 3:
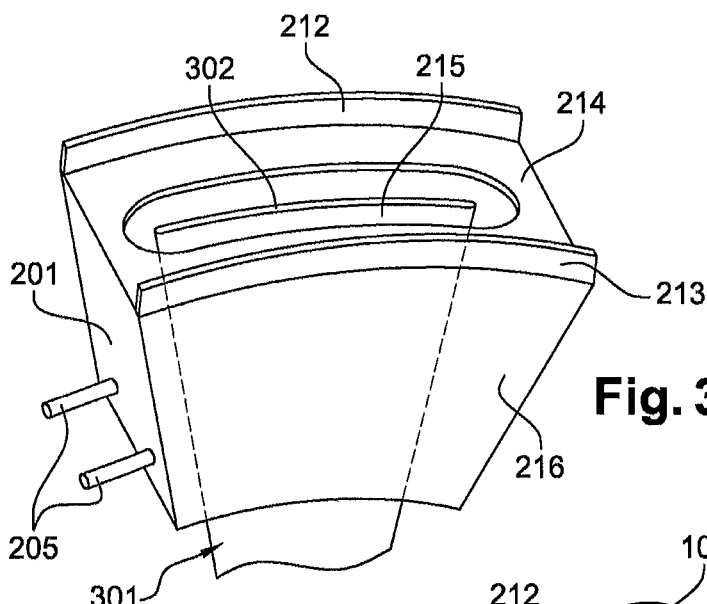
in FIG. 3, a schematic representation of an assembled portion of the tool of FIG. 2.

FIG. 3 presents an exemplary assembly of the enclosure 201 and of the intermediate part 211: the planar supports 206 and 207 act as a resting surface for the top surface 214 of the intermediate part 211. Walls 216 are positioned against the enclosure 201, in order to ensure the support of the intermediate part. A vane 301, which has a top portion 302 to be repaired, can thus be fed through the opening 204 of the enclosure 201 and the top portion 302 is positioned facing the opening 215 in order to be reached by the laser emitted by the nozzle 103. In an alternative embodiment of the tool according to the invention, the enclosure 201 and the intermediate part 211 form only one one-piece part.

Figure 4:
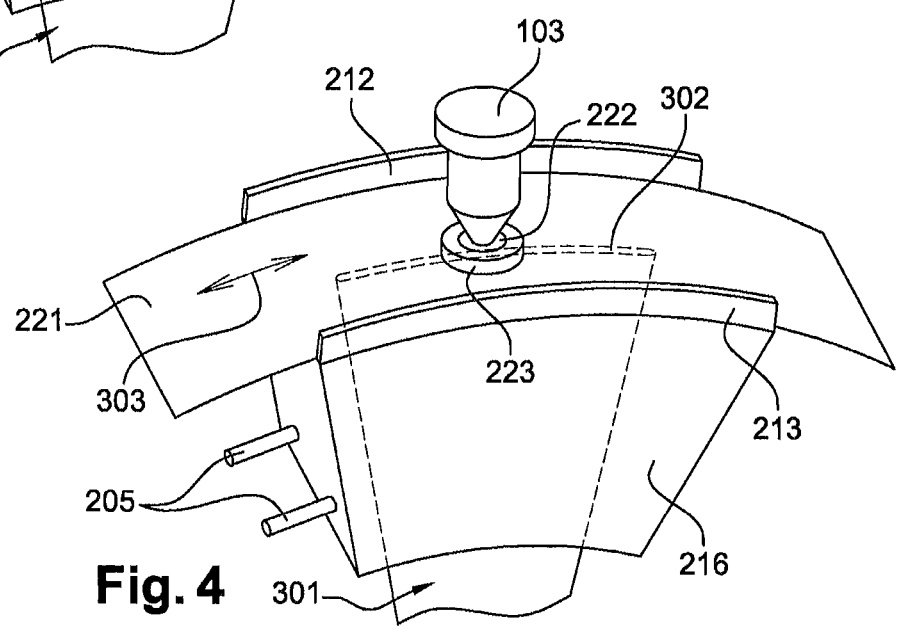
in FIG. 4, a perspective schematic representation of an exemplary implementation of the method according to the invention.

FIG. 4 shows the assembly of FIG. 3 supplemented by the mobile cover 221. The latter has a width which is adapted to the distance between the guide rails 212 and 213 so as to be able to slide between these guide rails according to a translational movement 303.

Figure 1:
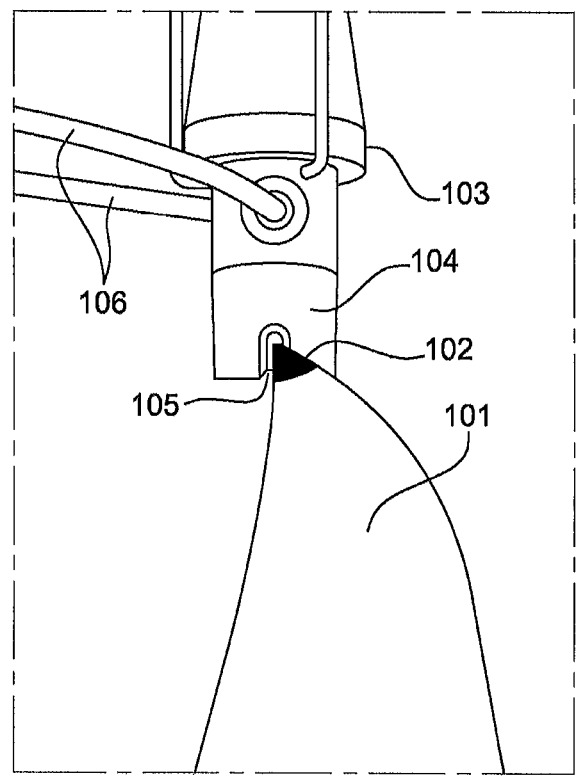
in FIG. 1, already described, a schematic representation of a method of the state of the art for hard-surfacing a vane.
Figure 5:
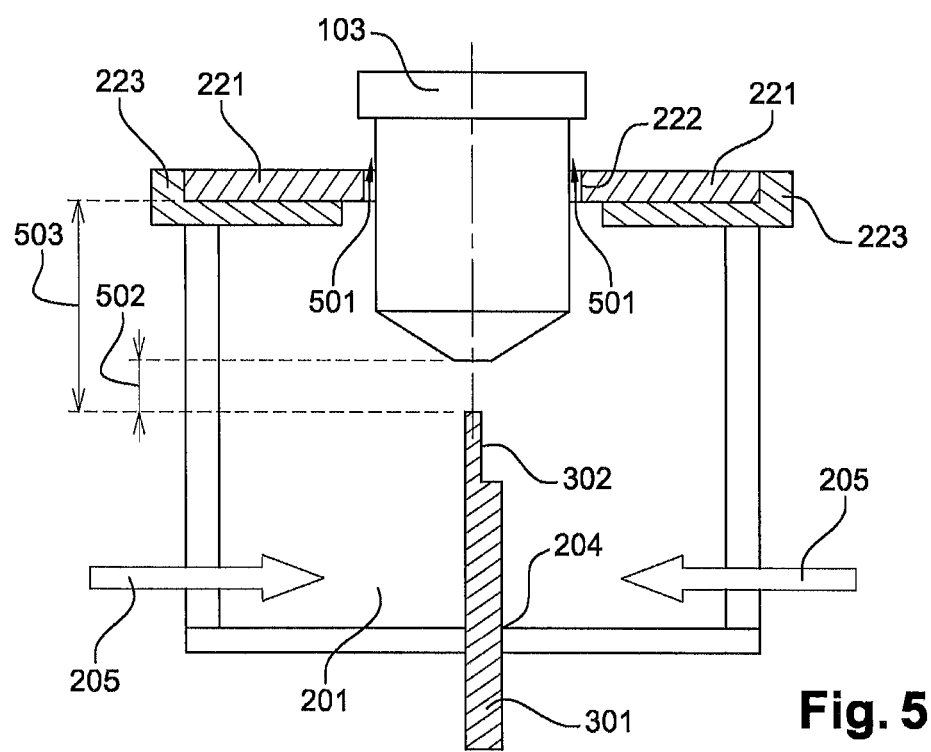
in FIG. 5, a cross-sectional schematic representation of the exemplary implementation of FIG. 4.

According to the method according to the invention, once the tool 200 is positioned and the vane 301 is introduced in the enclosure 201, the nozzle 103 is brought to the level of the opening 222 of the mobile cover 221. As can be seen in FIG. 5, the nozzle 103 is pressed into the opening 222, and it is its movement, when it travels over a path for hard-surfacing, which drives the mobile cover 221 into movement, by contacting the reinforcement 223 when present. The nozzle 103 is then introduced in the enclosure 201 with a varying hard-surfacing distance, over the course of successive passages for hard-surfacing the end 302, between a minimum hard-surfacing distance 502, typically equal to three millimetres, and a maximum hard-surfacing distance 503, typically equal to thirty millimetres.

As can be seen in FIG. 5, there is a clearance 501 between the nozzle 103 and some portions of the outline of the opening 222, which provides a gradual discharge of the inert gas sent into the enclosure 201. The cover 221 enables the leakage level to be restricted during welding, by controlling it. The use of a gas heavier than air (such as argon), as well as the use of a tight tool at the opening 204, for example through the use of insulation foams, allows only an argon leakage through overflowing at the mobile cover 221, thus preventing any air ingress. By way of example, the argon flow rate at the means 205 for introducing an inert gas is in the order of 10 to 20 litres per minute, in order to ensure a pressure of 5 bars.

The invention claimed is:

1. A method for hard-surfacing a metal part for an aircraft turbofan, said method involving a nozzle outputting a laser beam or an electron beam, which is to heat a sprayed powder for hard-surfacing said metal part, said method being carried out with a tool including
    said nozzle, and
    an enclosure including:
        a bottom opening through which the metal part to be hard-surfaced is fed, wherein the bottom opening is constructed and arranged so that a portion of the metal part to be hard surfaced can pass through said bottom opening during hard-surfacing, a top portion with a first opening, said top portion supporting guide rails;
    an intermediate part, positioned at least on the top portion of the enclosure, having said guide rails, said guide rails including a first guide rail and a second guide rail, and
    a mobile cover covering the opening of the top portion, said mobile cover having a second opening, and the nozzle extending through the opening to carry out the hard-surfacing of the metal part, said mobile cover being driven into movement by the nozzle following a path for hard-surfacing, the mobile cover being slidably movable on said intermediate part and a movement of the mobile cover being guided by the first and second guide rails,
    wherein a clearance is maintained between the nozzle and a portion of a periphery of the opening of the mobile cover when the nozzle extends through the opening of the mobile cover to permit gas present under the mobile cover to escape via said clearance, the method comprising:
    positioning the metal part to be hard-surfaced in the enclosure having the top portion with the opening;
    positioning a mobile cover covering the opening of the top portion;
    positioning the nozzle at the opening of the mobile cover;
    feeding an inert gas into the enclosure;
    spraying metal powders and emitting the laser or electron beam for hard-surfacing the metal part;
    moving the nozzle relative to the enclosure, along the path for hard-surfacing the metal part, the movement of the nozzle causing the movement of the mobile cover on a top surface of the enclosure.

2. The method according to the claim 1, wherein the movement of the mobile cover is caused by the nozzle contacting a reinforcement of the opening of the cover covering the top portion.

3. The method according to claim 1, wherein the top portion supports the guide rails, the movement of the mobile cover being guided by the guide rails.

4. The method according to the claim 3, further comprising, prior to positioning the mobile cover, positioning the guide rails on the top portion of the enclosure.

5. The method according to claim 1, wherein positioning the metal part to be hard-surfaced in the enclosure comprises feeding, through an opening provided in a bottom portion of the enclosure, said metal part.

6. The method according to claim 1, wherein the path for hard-surfacing the metal part comprises several back and forth motions, the nozzle having a hard-surfacing distance relative to the metal part which varies as the back and forth motions proceed.

7. The method according to the claim 6, wherein the hard-surfacing distance varies from three millimetres to thirty millimetres.

8. A tool constructed and arranged to implement a method for hard-surfacing a portion of a metal part for an aircraft turbofan, said hard-surfacing being carried out by a laser or electron beam, provided by a nozzle, heating a powder for hard-surfacing said metal part, the tool comprising:
    said nozzle, and
    an enclosure including:
        a bottom opening through which the metal part to be hard-surfaced is fed, wherein the bottom opening is constructed and arranged so that said portion of the metal part to be hard surfaced can pass through said bottom opening during hard-surfacing,
        a top portion with a first opening, said top portion supporting guide rails;
    an intermediate part, positioned at least on the top portion of the enclosure, having said guide rails, said guide rails including a first guide rail and a second guide rail, and
    a mobile cover covering the opening of the top portion, said mobile cover having a second opening, and the nozzle extending through the opening to carry out the hard-surfacing of the metal part, said mobile cover being driven into movement by the nozzle following a path for hard-surfacing, the mobile cover being slidably movable on said intermediate part and a movement of the mobile cover being guided by the first and second guide rails,
    wherein a clearance is maintained between the nozzle and a portion of a periphery of the opening of the mobile cover when the nozzle extends through the opening of the mobile cover to permit gas present under the mobile cover to escape via said clearance.

9. The tool according to claim 8, wherein the mobile cover is made of a soft material or with metal plates joined by a metal strip.

10. The tool according to claim 8, wherein the intermediate part comprises an opening to face the metal part to be hard-surfaced when the metal part is positioned in the enclosure.

11. The tool according to claim 8, wherein the enclosure and the intermediate part form a one-piece element.

12. The tool according to claim 8, wherein the bottom opening of the enclosure receiving the metal part to be hard-surfaced is sealed.

13. The tool according to claim 8, wherein the enclosure comprises a device to feed an inert gas.

14. The tool according to claim 9, wherein the mobile cover is made of aluminium strips.

15. The tool according to claim 8, wherein the metal part is a vane or a blade of the aircraft turbofan.

16. A tool constructed and arranged to implement a method for hard-surfacing a metal part for an aircraft turbofan, said hard-surfacing being carried out by a laser or electron beam, provided by a nozzle, heating a powder for hard-surfacing said metal part, the tool comprising:
said nozzle, and
an enclosure including:
a bottom wall having a bottom opening through which the metal part to be hard-surfaced is fed,
a top portion with a first opening;
an intermediate part having a top surface and a first and a second guide rails provided on either side of the top surface and extending away from the top surface, the top surface having a second opening formed therethrough, the intermediate part positioned on the top portion of the enclosure so that the top surface of the intermediate part covers the top portion of the enclosure and the second opening is provided over the first opening, and
a mobile cover covering the top surface of the intermediate part, said mobile cover having a third opening, and the nozzle extending through the third opening to carry out the hard-surfacing of the metal part, said mobile cover being driven into movement by the nozzle following a path for hard-surfacing, the mobile cover being slidably movable on the top surface of the intermediate part and being slidably arranged between the first and second guide rails such that the movement of the mobile cover is guided by the first and second guide rails and the third opening is provided over the second opening during said movement,
wherein a clearance is maintained between the nozzle and a portion of a periphery of the third opening of the mobile cover when the nozzle extends through the third opening to permit gas present under the mobile cover to escape via said clearance.

17. The tool according to claim 16, wherein the first opening is larger than the second opening and the second opening is larger than the third opening.

* * * * *